US011806970B2

(12) United States Patent
Zhou et al.

(10) Patent No.: US 11,806,970 B2
(45) Date of Patent: Nov. 7, 2023

(54) MULTILAYER SHEETS INCLUDING POLYPHENYLENE AND POLYPROPYLENE AND METHODS OF MAKING THE SAME (AS AMENDED)

(71) Applicant: SABIC Global Technologies, B.V., Bergen op Zoom (NL)

(72) Inventors: Jian Zhou, Evansville, IN (US); Juha-Matti Levasalmi, Delmar, NY (US); Zhaokang Hu, Newburgh, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 246 days.

(21) Appl. No.: 16/474,988

(22) PCT Filed: Dec. 26, 2017

(86) PCT No.: PCT/US2017/068389
§ 371 (c)(1),
(2) Date: Jun. 28, 2019

(87) PCT Pub. No.: WO2018/125855
PCT Pub. Date: Jul. 5, 2018

(65) Prior Publication Data
US 2019/0322089 A1 Oct. 24, 2019

Related U.S. Application Data

(60) Provisional application No. 62/439,718, filed on Dec. 28, 2016.

(51) Int. Cl.
*B32B 27/08* (2006.01)
*B32B 27/28* (2006.01)
(Continued)

(52) U.S. Cl.
CPC ............ *B32B 27/08* (2013.01); *B32B 27/285* (2013.01); *B32B 27/302* (2013.01); *B32B 27/32* (2013.01);
(Continued)

(58) Field of Classification Search
CPC ..... B32B 27/302; B32B 27/285; B32B 27/32; B32B 27/08; B32B 2307/71;
(Continued)

(56) References Cited

U.S. PATENT DOCUMENTS

| 3,971,748 A | 7/1976 | Wang et al. |
| 4,760,118 A | 7/1988 | White et al. |

(Continued)

FOREIGN PATENT DOCUMENTS

| EP | 2426730 A1 | 3/2012 |
| JP | 2006147551 A | 6/2006 |

(Continued)

OTHER PUBLICATIONS

Written Opinion No. PCT/US2017/068389; dated Mar. 5, 2018; pp. 6.

(Continued)

*Primary Examiner* — Samir Shah
(74) *Attorney, Agent, or Firm* — CANTOR COLBURN LLP

(57) ABSTRACT

A multilayer sheet includes a core layer including a composition including about (60) to about (90) weight percent of polyphenylene, about (0) to about (20) weight percent of polystyrene, about (10) to about (20) weight percent of a hydrogenated block copolymer of an alkenyl aromatic compound and a conjugated diene, and optionally, a flame retardant additive; and a first cap layer disposed on a surface of the core layer, wherein the first cap layer includes polypropylene.

14 Claims, 1 Drawing Sheet

(51) Int. Cl.
  *B32B 27/30* (2006.01)
  *B32B 27/32* (2006.01)
(52) U.S. Cl.
  CPC . *B32B 2307/206* (2013.01); *B32B 2307/3065* (2013.01); *B32B 2307/71* (2013.01); *B32B 2457/08* (2013.01); *B32B 2457/10* (2013.01); *B32B 2457/12* (2013.01); *B32B 2605/10* (2013.01); *B32B 2605/18* (2013.01)
(58) Field of Classification Search
  CPC ............ B32B 2270/00; B32B 2605/10; B32B 2605/18; B32B 2307/3065; B32B 2457/08; B32B 2457/10; B32B 2457/12; B32B 2307/206
  See application file for complete search history.

(56) References Cited

U.S. PATENT DOCUMENTS

| | | |
|---|---|---|
| 4,764,559 A | 8/1988 | Yamauchi et al. |
| 4,839,425 A | 6/1989 | Mawatari et al. |
| 6,984,442 B2 | 1/2006 | Brebion et al. |
| 7,736,727 B2 | 6/2010 | Blackburn et al. |
| 8,110,632 B2 | 2/2012 | Lietzau et al. |
| 8,912,261 B2 | 12/2014 | Takamura |
| 9,050,743 B2 | 6/2015 | Choi et al. |
| 9,187,640 B2 | 11/2015 | Furukawa et al. |
| 9,231,335 B2 | 1/2016 | Ishii et al. |
| 9,284,452 B2 | 3/2016 | Kono et al. |
| 2005/0080185 A1 | 4/2005 | Mhetar |
| 2006/0089458 A1 | 4/2006 | Davis et al. |
| 2006/0115667 A1* | 6/2006 | Verrocchi ............... B32B 25/08 428/517 |
| 2009/0082520 A1 | 3/2009 | Zijlma et al. |
| 2010/0179290 A1 | 7/2010 | Lietzau et al. |
| 2012/0097220 A1* | 4/2012 | Miyashita ............... B32B 27/08 136/251 |
| 2014/0045979 A1* | 2/2014 | Ziegler ................... C08L 71/12 524/127 |
| 2014/0134417 A1 | 5/2014 | Sharma et al. |
| 2014/0230887 A1 | 8/2014 | Eguchi et al. |
| 2016/0075874 A1 | 3/2016 | Song |
| 2017/0260366 A1 | 9/2017 | Pfaendner et al. |
| 2019/0345329 A1 | 11/2019 | Zhou et al. |

FOREIGN PATENT DOCUMENTS

| | | |
|---|---|---|
| JP | 2011126122 A | 6/2011 |
| JP | 2011146671 A | 7/2011 |
| JP | 2012146698 A | 8/2012 |
| WO | 2008060738 A1 | 5/2008 |
| WO | 2012030129 A2 | 3/2012 |
| WO | 2018125885 A1 | 7/2018 |
| WO | 2018136207 A2 | 7/2018 |

OTHER PUBLICATIONS

International Search Report No. PCT/2017/068389; dated Mar. 5, 2019; pp. 6.
International Search Report for International Application No. PCT/US2017/068391; International Filing Date Dec. 26, 2017; dated Jul. 19, 2018; 6 pages.
Written Opinion for International Application No. PCT/US2017/068391; International Filing Date Dec. 26, 2017; dated Jul. 19, 2018; 7 pages.
Jones et al., "Polyphenylenese, 27", Synthesis by Step Polymerization, 1989, 8 pages.
Polysource, "Plastic Resin Families and Applications", https://polysource.net/plastic-resin-families-and-applications/, retrieved Jun. 11, 2021, 28 pages.

* cited by examiner

MULTILAYER SHEETS INCLUDING POLYPHENYLENE AND POLYPROPYLENE AND METHODS OF MAKING THE SAME (AS AMENDED)

CROSS REFERENCE TO RELATED APPLICATIONS

This application is a National Stage application, i.e., a 371 of PCT/US2017/068389, filed Dec. 26, 2017, which is incorporated herein by reference in its entirety, and which claims the benefit of U.S. Provisional Application No. 62/439,718, filed Dec. 28, 2016.

BACKGROUND

Poly(phenylene ether) based films can be used for electrical insulation applications due to desirable mechanical properties such as hydrothermal resistance, electrical insulation, dimensional stability, and potentially halogen-free flame retardance. Poly(phenylene ether) based films can be used in various articles such as a backsheet component layer in photovoltaic modules. In such applications, an adhesive layer is typically required because the polyphenylene ether based layer and another layer, such as an ultraviolet light shielding layer are not compatible with one another. With such a laminated structure, hydrolysis of the adhesive layer can occur after long-term exposure to high humidity and high temperatures. Furthermore, the lamination process adds additional cost to the article production.

Thus, there is a need for a multilayer sheet without an adhesive layer that will provide the same or better mechanical properties as compared to a multilayer sheet with an adhesive layer.

SUMMARY

Disclosed, in various embodiments, are multilayer sheets including polyphenylene and polypropylene as well as methods of making thereof.

A multilayer sheet, comprises: a core layer comprising a composition comprising about 60 to about 90 weight percent of polyphenylene, about 0 to about 20 weight percent of polystyrene, about 10 to about 20 weight percent of a hydrogenated block copolymer of an alkenyl aromatic compound and a conjugated diene, and optionally, a flame retardant additive; and a first cap layer disposed on a surface of the core layer, wherein the first cap layer comprises polypropylene.

A method of making a multilayer sheet, comprises: co-extruding a core layer and a first cap layer, wherein the core layer comprises about 60 to about 90 weight percent of polyphenylene, about 0 to about 20 weight percent of polystyrene, about 10 to about 20 weight percent of a hydrogenated block copolymer of an alkenyl aromatic compound and a conjugated diene, and optionally, a flame retardant additive; and wherein the first cap layer comprises polypropylene.

A multilayer sheet, comprises: a core layer disposed between a first cap layer and a second cap layer; wherein the core layer comprises 60 to 85 weight percent of polyphenylene ether, 10 to 20 weight percent of polystyrene, 10 to 20 weight percent of a hydrogenated block copolymer of an alkenyl aromatic compound and a conjugated diene, and a flame retardant additive; and wherein the first cap layer and/or the second cap layer comprises polypropylene.

These and other features and characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
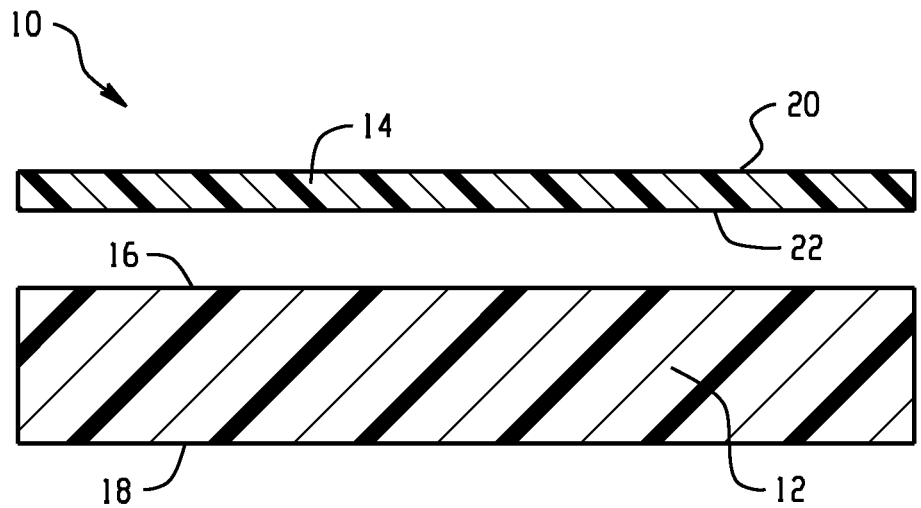
FIG. 1 is a depiction of a multilayer sheet comprising a core layer and a cap layer.

Disclosed herein are multilayer sheets which are free from an adhesive layer and which provide the desired mechanical properties for use in various applications. For example, the multilayer sheet can include a core layer and a first cap layer disposed on a surface of the core layer. Optionally, the multilayer sheets can include a second cap layer disposed on another surface of the core layer. The second cap layer can comprise the same or different material than the first cap layer. The core layer can comprise a composition comprising combination of polyphenylene, e.g., poly(phenylene ether), optional polystyrene, and a hydrogenated block copolymer. Optionally, a flame retardant can be present in either or both of the core layer or the cap layer when the multilayer sheet is to be used in applications that desire flame retardance. Interlayer bonding strength between the core layer and the cap layer(s) can be increased with the use of a hydrogenated block copolymer in the core layer comprising greater than or equal to 10 weight percent of the core layer composition. The hydrogenated block copolymer can comprise an alkenyl aromatic compound and a conjugated diene. Examples of such block copolymers include hydrogenated diblock or triblock copolymers. For example, the hydrogenated block copolymer can include copolymers of polystyrene and poly-ethylene-butylene, for example, styrene-ethylene-butylene (SEB), styrene-ethylene-butylene-styrene (SEBS), or a combination comprising at least one of the foregoing.

The core layer can comprise a composition comprising about 60 to about 90 weight percent of the polyphenylene, about 0 to about 20 weight percent of the polystyrene, for example about 10 to about 20 weight percent of the polystyrene, and about 10 to about 20 weight percent of the hydrogenated block copolymer. When present in the core layer, the flame retardant additive can be present in an amount of 5 to 20 weight percent. When present in the cap layer, the flame retardant additive can be present in an amount of less than or equal to 60 weight percent.

The polyphenylene used in the core layer composition can comprise a poly(phenylene ether). Poly(phenylene ether)s include those comprising repeating structural units having the formula

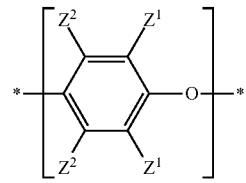

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxyl group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

In some embodiments, the poly(phenylene ether) has an intrinsic viscosity of 0.25 to 1 deciliter per gram measured by Ubbelohde viscometer at 25° C. in chloroform. For example, the poly(phenylene ether) intrinsic viscosity can be 0.25 to 0.5 deciliter per gram, or or 0.4 to 0.5 deciliter per gram, or 0.4 deciliter per gram.

In some embodiments, the poly(phenylene ether) comprises a homopolymer or copolymer of monomers selected from the group consisting of 2,6-dimethylphenol, 2,3,6-trimethylphenol, and combinations thereof. Desirable poly(phenylene ether) homopolymers are commercially available as, for example, NORYL* PPO* 640 and 646 Resins from SABIC, and XYRON* S201A and S202A Resins from Asahi Kasei Chemicals Corporation.

The composition comprises the poly(phenylene ether) in an amount of 60 to 85 parts by weight, based on 100 parts by weight total of the poly(phenylene ether), the hydrogenated block copolymer, the optional polystyrene, and the optional flame retardant. Within this range, the poly(phenylene ether) amount can be 65 to 90 parts by weight, for example, 70 to 85 parts by weight.

In some embodiments, the poly(phenylene ether) can be capped with an end capping agent. To produce the capped poly(phenylene ether), the poly(phenylene ether) is reacted in with at least one ester of salicylic acid or anthranilic acid or a substituted derivative thereof in a solvent. As used herein, the term "ester of salicylic acid" includes compounds in which the carboxy group, the hydroxy group or both have been esterified.

Other than as defined above, the precise molecular structure of the ester is not critical. Various substituents may be present on the salicylate ring, including, for example, alkyl, aryl, alkoxy, acyl, nitro, carbalkoxy and nitro. Desirable capping agents are aryl salicylates such as phenyl salicylate, aspirin (i.e., acetylsalicylic acid), salicylic carbonate and polysalicylates (PSAL), including both linear polysalicylates and cyclic compounds such as disalicylide and trisalicylide.

During preparation, the poly(phenylene ether) can be heated in solution with the capping agent. Reaction temperatures are about 160° to about 300° C. Aromatic solvents such as benzene, toluene, xylene and o-dichlorobenzene, tetrachloromethane, trichloromethane, dichloromethane, 1,2-dichloroethane can be used. The molar proportion of capping agent will to some extent depend on the molecular weight and level of hydroxyl end groups in the PPE, as well as other hydroxy-substituted "tail" end groups resulting from equilibration with diphenoquinone. About 1-10 molar equivalents, most often about 2-4 molar equivalents, and preferably about 2.5-3.5 molar equivalents of capping agent, based on poly(phenylene ether) hydroxyl number, is usually sufficient.

It is also contemplated to include at least one polystyrene in the composition. The term "polystyrene" as used herein includes polymers prepared by methods known in the art including bulk, suspension and emulsion polymerization, which contain at least 25% by weight of structural units derived from a monomer of the formula

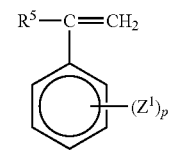

wherein $R^5$ is hydrogen, lower alkyl or halogen; $Z^1$ is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, alpha-methylstyrene, ethylvinylbenzene, divinylbenzene and maleic anhydride, and rubber-modified polystyrenes comprising blends and grafts, wherein the rubber is a polybutadiene or a rubbery copolymer of about 98-70% styrene and about 2-30% diene monomer. Polystyrenes are known to be miscible with poly(phenylene ether) in all proportions, and any such blend may contain polystyrene in amounts of about 5-95% and most often about 25-75%, based on total resins.

The capped poly(phenylene ether) can provide advantages as compared to uncapped PPE. For example, capped poly(phenylene ether) is less susceptible to oxidative degradation at high temperatures. This is demonstrated by an increase in time to embrittlement upon heat aging in air, and also by a decrease in oxygen uptake under high-temperature conditions. For the most part, tensile properties are not materially affected by capping. Additionally, the capped poly(phenylene ether) reduces to a large part the radical scavenging the capability of the poly(phenylene ether). Thus, capped poly(phenylene ether) is useful in process that involve radical initiation and/or reactions, e.g., styrene polymerization processes as well as unsaturated polyester, allylic, and bismaleimide thermosetting resins.

Depending on the capping agent used, the glass transition and heat distortion temperatures of the capped polymers may be lower than those of the corresponding uncapped poly(phenylene ether). For example, linear polysalicylates are found to cause a greater decrease in said temperatures than salicylic carbonate. This phenomenon is apparently the result of various by-products which plasticize the polyphenylene ether. The plasticization effect may be decreased or eliminated by dissolving and re-precipitating the polymer after capping, thus removing the plasticizing materials.

In addition to the poly(phenylene ether), the composition comprises a hydrogenated block copolymer of an alkenyl aromatic monomer and a conjugated diene. For brevity, this component is referred to as the "hydrogenated block copolymer". The hydrogenated block copolymer can comprise 10 to 90 weight percent of poly(alkenyl aromatic) content and 90 to 10 weight percent of hydrogenated poly(conjugated diene) content, based on the weight of the hydrogenated block copolymer. In some embodiments, the hydrogenated block copolymer is a low poly(alkenyl aromatic content) hydrogenated block copolymer in which the poly(alkenyl aromatic) content is 10 to less than 40 weight percent, or 20 to 35 weight percent, or 25 to 35 weight percent, or 30 to 35 weight percent, all based on the weight of the low poly(alkenyl aromatic) content hydrogenated block copolymer. In other embodiments, the hydrogenated block copolymer is a high poly(alkenyl aromatic content) hydrogenated block copolymer in which the poly(alkenyl aromatic) content is 40 to 90 weight percent, or 50 to 80 weight percent, or 60 to 70 weight percent, all based on the weight of the high poly(alkenyl aromatic content) hydrogenated block copolymer.

In some embodiments, the hydrogenated block copolymer has a weight average molecular weight of 40,000 to 200,000 atomic mass units. The number average molecular weight and the weight average molecular weight can be determined by gel permeation chromatography and based on comparison to polystyrene standards. In some embodiments, the hydrogenated block copolymer has a weight average molecular weight of 50,000 to 100,000 atomic mass units, or 100,000 to 150,000 atomic mass units.

Molecular weight (as used herein, reference to molecular weight refers to weight average molecular weight (Mw) of the hydrogenated block copolymer can have an effect on the ability to produce the multilayer sheet. For example, the use of a higher molecular weight hydrogenated block copolymer (e.g., having a Mw of 200,000 to 400,000) can cause the viscosity of the core layer composition to be such that it cannot be processed to form the multilayer sheet. The use of a lower molecular weight hydrogenated block copolymer (e.g., having a Mw of 100,000 to 150,000) can allow the core layer composition to have a viscosity sufficient to allow processing into a multilayer sheet.

The alkenyl aromatic monomer used to prepare the hydrogenated block copolymer can have the structure

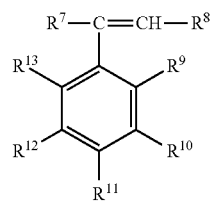

wherein $R^7$ and $R^8$ each independently represent a hydrogen atom, a $C_1$-$C_8$ alkyl group, or a $C_2$-$C_8$ alkenyl group; $R^9$ and $R^{13}$ each independently represent a hydrogen atom, a $C_1$-$C_8$ alkyl group, a chlorine atom, or a bromine atom; and $R^{10}$, $R^{11}$, and $R^{12}$ each independently represent a hydrogen atom, a $C_1$-$C_8$ alkyl group, or a $C_2$-$C_8$ alkenyl group, or $R^{10}$ and $R^{11}$ are taken together with the central aromatic ring to form a naphthyl group, or $R^{11}$ and $R^{12}$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene is 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, or at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination thereof.

In some embodiments, the hydrogenated block copolymer comprises a polystyrene-poly(ethylene-butylene-styrene)-polystyrene tapered block copolymer. For brevity, this component is referred to as the "tapered block copolymer". Tapered block copolymers are also known as controlled distribution block copolymers. In some embodiments, the tapered block copolymer has a polystyrene content of 30 to 70 weight percent, or 35 to 65 weight percent, based on the weight of the tapered block copolymer. In some embodiments, the tapered block copolymer has a melt flow rate of 0 to 10 grams per 10 minutes, measured at 260° C. and 5 kilogram load according to ASTM D1238-13. Tapered block copolymers are commercially available as, for example, KRATON™ A1535 and A1536 Resins from Kraton Performance Polymers.

The hydrogenated block copolymer can consist of polystyrene-poly(ethylene-butylene)-polystyrene triblock copolymer. Alternatively, the hydrogenated block copolymer can comprise polystyrene-poly(ethylene-butylene)-polystyrene triblock copolymer and tapered block copolymer. For example, the 5 to 40 parts by weight of the hydrogenated block copolymer can comprise 3 to 12 parts by weight of polystyrene-poly(ethylene-butylene)-polystyrene triblock copolymer and 22 to 35 parts by weight of the tapered block copolymer. Alternatively, the hydrogenated block copolymer can consist of the tapered block copolymer. In some embodiments, the hydrogenated block copolymer comprises 70 to 100 weight percent of a polystyrene-poly(ethylene-butylene-styrene)-polystyrene tapered block copolymer, based on the weight of the hydrogenated block copolymer.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In some embodiments, the hydrogenated block copolymer includes the residue of one or more acid functionalizing agents, such as maleic anhydride.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Performance Polymers Inc. as KRATON™ G1701 (having about 37 weight percent polystyrene) and G1702 (having about 28 weight percent polystyrene); the polystyrene-poly(ethylene-butylene)-polystyrene triblock copolymers available from Kraton Performance Polymers Inc.as KRATON™ G1641 (having about 33 weight percent polystyrene), G1650 (having about 30 weight percent polystyrene), G1651 (having about 33 weight percent polystyrene), and G1654 (having about 31 weight percent polystyrene); and the polystyrene-poly(ethylene-ethylene/propylene)-polystyrene triblock copolymers available from Kuraray as SEPTON™ S4044, S4055, S4077, and S4099.

Additional commercially available hydrogenated block copolymers include polystyrene-poly(ethylene-butylene)-polystyrene (SEBS) triblock copolymers available from Dynasol as CALPRENE™ H6140 (having about 31 weight percent polystyrene), H6170 (having about 33 weight percent polystyrene), H6171 (having about 33 weight percent polystyrene), and H6174 (having about 33 weight percent polystyrene), and from Kuraray as SEPTON™ 8006 (having about 33 weight percent polystyrene) and 8007 (having about 30 weight percent polystyrene); polystyrene-poly(ethylene-butylene-styrene)-polystyrene tapered block copolymers available from Kraton Performance Polymers as KRATON™ A1535 (having 56.3-60.3 weight percent polystyrene) and A1536 (having 37-44 weight percent polystyrene); polystyrene-poly(ethylene-propylene)-polystyrene (SEPS) copolymers available from Kuraray as SEPTON™ 2006 (having about 35 weight percent polystyrene) and 2007 (having about 30 weight percent polystyrene); and oil-extended compounds of these hydrogenated block copolymers available from Kraton Performance Polymers Inc.as KRATON™ G4609 (containing about 45% mineral oil, and the SEBS having about 33 weight percent polystyrene) and G4610 (containing about 31% mineral oil, and the SEBS having about 33 weight percent polystyrene); and from Asahi as TUFTEC™ H1272 (containing about 36% oil, and the SEBS having about 35 weight percent polystyrene). Mixtures of two of more hydrogenated block copolymers can be used.

The composition comprises the hydrogenated block copolymer in an amount of 10 to 20 parts by weight, based on 100 parts by weight total of the poly(phenylene ether), the hydrogenated block copolymer, the optional polystyrene, and the optional flame retardant.

Depending on the application the core layer composition can optionally further include various additives, for example, a flame retardant additive in an amount of 5 to 20 weight percent. The flame retardant additive can assist in providing low smoke and low heat release properties to the overall multilayer sheet when desired. The flame retardant additive can comprise a halogen containing flame retardant additive, a non-halogen containing flame retardant additive, or a combination comprising at least one of the foregoing. The halogen containing flame retardant additive can include a phosphorous containing flame retardant additive.

Suitable flame retardants that can be included in the base layer can be organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Other suitable aromatic phosphates can be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

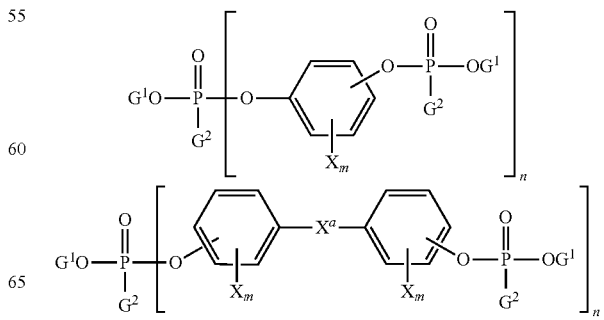

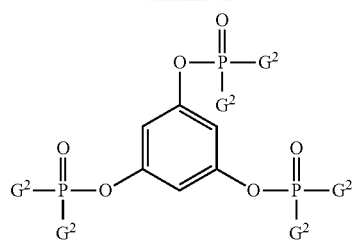

wherein each $G^1$ is independently a hydrocarbon having 1 to 30 carbon atoms; each $G^2$ is independently a hydrocarbon or hydrocarbonoxy having 1 to 30 carbon atoms; each $X^a$ is independently a hydrocarbon having 1 to 30 carbon atoms; each X is independently a bromine or chlorine; m is 0 to 4, and n is 1 to 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Specific aromatic organophosphorus compounds have two or more phosphorus-containing groups, and are inclusive of acid esters of formula (20)

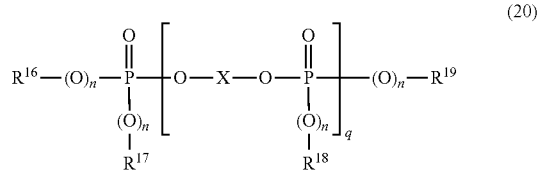

(20)

wherein $R^{16}$, $R^{17}$, $R^{18}$, and $R^{19}$ are each independently $C_1$-$C_8$ alkyl, $C_{5-6}$cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is an aromatic group. In some embodiments $R^{16}$, $R^{17}$, $R^{18}$, and $R^{19}$ are each independently $C_{1-4}$ alkyl, naphthyl, phenyl($C_{1-4}$alkylene, or aryl groups optionally substituted by $C_{1-4}$ alkyl. Specific aryl moieties are cresyl, phenyl, xylenyl, propylphenyl, or butylphenyl. In some embodiments X in formula (20) is a mono- or poly-nuclear aromatic $C_{6-30}$ moiety derived from a diphenol. Further in formula (20), n is each independently 0 or 1; in some embodiments n is equal to 1. Also in formula (20), q is from 0.5 to 30, from 0.8 to 15, from 1 to 5, or from 1 to 2. In some embodiments, $R^{16}$, $R^{17}$, $R^{18}$ and $R^{19}$ are each independently non-alkylated $C_{6-20}$ aryl, and X is a mono- or poly-nuclear aromatic $C_{6-30}$ moiety, n is each independently 0 or 1, and q is from 0.5 to 30.

In these embodiments, each of $R^{16}$, $R^{17}$, $R^{18}$, and $R^{19}$ can be aromatic, i.e., phenyl, n is 1, and p is 1-5, specifically 1-2, and X can be represented by the following divalent groups (21), or a combination comprising one or more of these divalent groups,

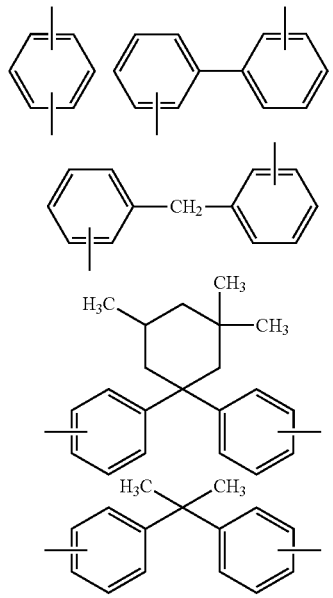

(21)

wherein the monophenylene and bisphenol-A groups can be specifically mentioned. In some embodiments at least one of $R^{16}$, $R^{17}$, $R^{18}$, $R^{19}$, and X corresponds to a monomer used to form the polycarbonate, e.g., bisphenol-A or resorcinol. In another embodiment, X is derived especially from resorcinol, hydroquinone, bisphenol-A, or diphenylphenol, and $R^{16}$, $R^{17}$, $R^{18}$, $R^{19}$, is aromatic, specifically phenyl. A specific aromatic organophosphorus compound of this type is resorcinol bis(diphenyl phosphate), also known as RDP. Another specific class of aromatic organophosphorus compounds having two or more phosphorus-containing groups are compounds of formula (22)

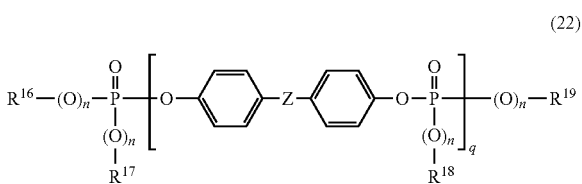

(22)

wherein $R^{16}$, $R^{17}$, $R^{18}$, $R^{19}$, n, and q are as defined for formula (20) and wherein Z is $C_{1-7}$ alkylidene, $C_{1-7}$ alkylene, $C_{5-12}$ cycloalkylidene, —O—, —S—, —SO$_2$—, or —CO—, specifically isopropylidene. A specific aromatic organophosphorus compound of this type is bisphenol-A bis(diphenyl phosphate), also known as BPADP, wherein $R^{16}$, $R^{17}$, $R^{18}$, and $R^{19}$ are each phenyl, each n is 1, and q is from 1 to 5, from 1 to 2, or 1.

Exemplary suitable flame retardant compounds containing phosphorus-nitrogen bonds include phosphonitrilic chloride, phosphorus ester amides, phosphoric acid amides, phosphonic acid amides, phosphinic acid amides, tris (aziridinyl) phosphine oxide. When present, phosphorus-containing flame retardants can be present in amounts of 0.1 to 10 percent by weight, based on the total weight of the polycarbonatesiloxane-arylate and any additional polymer.

Halogenated materials can also be used as flame retardants, for example 2,2-bis-(3,5-dichlorophenyl)-propane; bis-(2-chlorophenyl)-methane; bis(2,6-dibromophenyl)- methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenylmethane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants can be present in amounts of 0.1 to 10 percent by weight, based on the total weight of the components in the core layer or the cap layer(s).

Inorganic flame retardants can also be used, for example salts of $C_{1-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complexes such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts can be present in amounts of 0.1 to 5 percent by weight, based on the total weight of the components in the core layer or the cap layer(s).

Anti-drip agents can also be used, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN, and can also be used as a flame retardant. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise, for example, 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate SAN to form an agglomerated material for use as an anti-drip agent. Either method can be used to produce an encapsulated fluoropolymer. Antidrip agents can be used in amounts of 0.1 to 5 percent by weight, based on the total weight of the components in the core layer or the cap layer(s).

The core layer composition and/or the cap layer(s) can further include impact modifier(s). Exemplary impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like. Impact modifiers are generally present in amounts of 1 to 30 wt. %, based on the total weight of the polymers in the composition.

The core layer composition and/or the cap layer(s) can include various additives ordinarily incorporated into polymer compositions of this type, with the proviso that the additive(s) are selected so as to not significantly adversely affect the desired properties of the polymeric composition, in particular hydrothermal resistance, water vapor transmission resistance, interlayer bonding strength, and thermal shrinkage. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agents) is generally 0.01 to 5 wt. %, based on the total weight of the composition.

Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 parts by weight, based on 100 parts by weight of the total composition, excluding any filler.

UV light absorbing stabilizers include triazines, dibenzoylresorcinols (such as TINUVIN* 1577 commercially available from BASF and ADK STAB LA-46 commercially available from Asahi Denka), hydroxybenzophenones; hydroxybenzotriazoles; hydroxyphenyl triazines (e.g., 2-hydroxyphenyl triazine); hydroxybenzotriazines; cyanoacrylates; oxanilides; benzoxazinones; 2-(2H-benzotriazol-2-yl)-4-(1,1,3,3-tetramethylbutyl)-phenol (CYASORB* 5411); 2-hydroxy-4-n-octyloxybenzophenone (CYASORB* 531); 2-[4,6-bis(2,4-dimethylphenyl)-1,3,5-triazin-2-yl]-5-(octyloxy)-phenol (CYASORB* 1164); 2,2'-(1,4-phenylene) bis(4H-3,1-benzoxazin-4-one) (CYASORB* UV-3638); 1,3-bis[(2-cyano-3,3-diphenylacryloyl)oxy]-2,2-bis[[(2-cyano-3,3-diphenylacryloyl)oxy]methyl]propane (UVINUL* 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with a particle size less than or equal to 100 nanometers, or combinations comprising at least one of the foregoing UV light absorbing stabilizers. UV light absorbing stabilizers are used in amounts of 0.01 to 5 parts by weight, based on 100 parts by weight of the total composition, excluding any filler.

The thickness of the core layer can vary depending upon the desired end use of the multilayer sheet. The core layer can comprise a monolithic (e.g., one wall, one layer) sheet or a multiwall sheet (e.g., comprising greater than one wall with greater than one air channel located therebetween) or a multilayer sheet. Generally, the thickness of the core layer can be less than or equal to 300 micrometers (m), for example, 75 μm to 300 μm, for example, 100 μm to 200 μm, for example, 150 μm to 175 μm, for example, 175 μm, as well as any and all ranges and endpoints located therebetween.

As with the core layer, the thickness of the cap layer(s) can vary depending on the desired end use of the multilayer sheet. The thickness of the first cap layer and/or the second cap layer can be the same or different. For example, the thickness of the first cap layer and/or the second cap layer can be less than or equal to 125 μm, for example, 25 μm to 125 μm, for example, 50 μm to 100 μm, for example, 75 μm to 90 μm, for example, 75 μm, as well as any and all ranges and endpoints located therebetween.

If present, the thickness of coating layer(s) can vary depending upon the desired end use of the multilayer sheet. Generally, the thickness of the coating layer(s) can be less than or equal to 50 μm, for example, 2 to 40 μm, for example, 3 to 30 μm, as well as any and all ranges and endpoints located therebetween.

If present, the coating can include a UV blocking layer to provide optical properties such as enhanced weatherability for underlying layers. If present, the UV blocking layer can be disposed on an outer surface of the cap layer (e.g., a cap layer first surface). In an exemplary embodiment, the UV blocking layer comprises a polycarbonate which includes a homopolycarbonate, copolycarbonate, a branched polycarbonate, or a combination comprising at least one of the foregoing polycarbonates. Optionally, the UV blocking layer can contain an effective amount of a flame retardant, as previously described herein. In a specific embodiment, where improved chemical resistance is needed, the UV blocking layer comprises a blend of a polycarbonate with a polyester, such as PCCD. The UV blocking layer also includes at least one ultraviolet absorber (UVA), such as, for example, benzotriazoles, o-hydroxybenzophenones, dibenzoylresorcinols, cyanoacrylates, triazines, formamidines, oxanilides and benzoxazinones. Other UVA's can be used without limitation. In a specific embodiment, a UV blocking layer has a thickness 10 to 250 μm. In another specific embodiment, the UV blocking layer comprises 2 to 10 wt % UVA based on the total weight of UV blocking layer. In another specific embodiment, the UV blocking absorber is co-extruded on one or both surfaces side of the multilayer sheet.

It is further contemplated that the multilayer sheet can comprise additional core and cap layers (e.g., greater than or equal to two core layers and/or greater than or equal to three cap layers). Additional layers or coatings can also be present on the surface of the cap layer(s). Such layers can include, but are not limited to, hardcoats (e.g., an abrasion resistant coating), UV resistant layers, infrared (IR) absorbing layers, etc. The additional layers contemplated can be added with the proviso that they do not adversely affect the desired properties of the multilayer sheet. Any feasible combination of the above described additional layers is also contemplated.

When the amount of the hydrogenated block copolymer in the core layer composition is greater than or equal to 10%, the interlayer bonding strength between the core layer and the cap layer(s) can be increased. For example, the interlayer bonding strength between the core layer and the cap layer can be greater than or equal to 0.1, for example, greater than or equal to 0.2, for example, greater than or equal to 0.3, for example, greater than or equal to 0.4, for example, greater than or equal to 0.5, for example, greater than or equal to 0.6, for example, greater than or equal to 0.7, for example, greater than or equal to 0.8, for example, greater than or equal to 0.9, for example, greater than or equal to 1.0, for example, greater than or equal to 1.5. Interlayer bonding strength can be measured according to ISO 11339. The multilayer sheets disclosed herein can also possess desirable thermal shrinkage in both the machine direction and the transverse direction. For example, the multilayer sheet can have a thermal shrinkage of less than or equal to 0.6% in the machine direction, for example, less than or equal to 0.5%, for example, less than or equal to 0.4%, for example, less than or equal to 0.3%, for example, less than or equal to 0.2%, for example, less than or equal to 0.1% when tested after exposure to a temperature of 150° C. for 30 minutes. The multilayer sheet can have a thermal shrinkage of less than or equal to 0.5% in the transverse direction, for example, less than or equal to 0.4%, for example, less than or equal to 0.3%, for example, less than or equal to 0.2%, for example, less than or equal to 0.1% when tested after exposure to a temperature of 150° C. for 30 minutes as tested according to ASTM D1204-2002. Desirable values for thermal shrinkage in the transverse direction (TD) are less than or equal to 0.6, while desirable values for thermal shrinkage in the machine direction (MD) are less than or equal to 1.0.

The first cap layer and/or the second cap layer can be formed with, i.e., directly attached to the core layer without the need for an adhesive layer therebetween. Stated another way, the first cap layer and/or the second cap layer can be in mechanical communication with one another such that no adhesive layer is present between the first cap layer and/or the second cap layer and the core layer. The cap layer composition can include homopolymers or copolymers of polypropylene. The first cap layer and/or the second cap layer can further include various additives to provide desired properties to the layers. For example, the first cap layer and/or the second cap layer can include an ultraviolet light stabilizer, an ultraviolet light absorber, a flame retardant additive, or a combination comprising at least one of the foregoing. The flame retardant additive can include a halogen containing flame retardant additive, a non-halogen containing flame retardant additive, or a combination comprising at least one of the foregoing, preferably wherein the halogen containing flame retardant additive comprises a phosphorous containing flame retardant additive. The non-halongenated flame retardant additive can include an intumescent flame retardant additive.

As described herein, all reference to a multilayer sheet also includes and encompasses multilayer films. The terms "sheet" and "film" are used interchangeably herein. The multilayer sheets disclosed herein can be utilized in a variety of applications, including, but not limited to photovoltaic module (e.g., a backsheet in a photovoltaic module), a solar hot water system, lithium-ion battery insulation (e.g., an insulation film), heat shielding (e.g., shielding applications in power supply housing), printed circuit board insulation, aircraft interior applications, railcar interior applications, business equipment insulation, computer rack partitions, monitor insulation.

Methods of making the multilayer sheet are also contemplated herein. The method can include co-extruding a core layer and a first cap layer. The core layer can be made from a composition comprising a combination of polyphenylene, polystyrene, and a hydrogenated block copolymer. Optionally, a flame retardant can be present in either or both of the core layer or the first cap layer when the multilayer sheet is to be used in applications that desire flame retardance. The core layer can include a core layer composition comprising about 60 to about 90 weight percent of the polyphenylene, for example about 60 to about 85 weight percent, about 0 to about 20 weight percent of the polystyrene, and about 10 to about 20 weight percent of the hydrogenated block copolymer. When present in the core layer, the flame retardant additive can be present in an amount of 5 to 20 weight percent. When present in the cap layer, the flame retardant additive can be present in an amount of less than or equal to 60 weight percent. The first cap layer can be made from polypropylene homopolymers or copolymers.

The method can further include co-extruding a second cap layer with the core layer and the first cap layer such that the core layer is disposed between the first cap layer and the second cap layer. The second cap layer can be made from the same or different material as the first cap layer. The second cap layer can optionally include a flame retardant additive, halogenated, or non-halogenated. The flame retardant additive, when present, can comprise an intumescent flame retardant additive.

Intumescent materials generally refers to materials that begin to swell and char when exposed to flames and then rapidly react to become a compact foam that delays heat migration. Intumescent materials can generally be used to restrain, retard, or suppress burning processes to give occupants trapped inside a structure (e.g., a train, airplane, or building) an opportunity to escape by giving off less dark smoke (e.g., black smoke which decreases visibility), acid gas, and/or carbon monoxide when a fire occurs. When exposed to flames and/or high heat, and/or when a cap layer comprises an intumescent flame retardant material, the cap layer can expand and produce a char, which can insulate the surface of the core layer and aid in keeping oxygen away from the core layer, thus protecting the core layer from burning and/or damage caused by flames. For example, the cap layer can, upon exposure to heat and/or flames (e.g., 50 kilowatts per square meter (50 kW/m$^2$)), produce a charred protective layer having a thickness of greater than or equal to 1.5 centimeters (cm), for example, greater than or equal to 2 cm.

Intumescent materials can be formed from a combination of materials including a carbon source, an expanding agent, an acid source, and a charring agent. The carbon source can comprise a material such as pentaerythritol, glucose, starch, talc, clay, polyol (e.g., sorbitol, Charmor™ PP100 manufactured by Perstorp), thermoplastic polymers, and combinations comprising at least one of the foregoing. Examples of thermoplastic polymers that can be used for the carbon source include polycarbonate, copolymers of polycarbonate, and combinations comprising at least one of the foregoing. For example, the carbon source can be a material such as a polycarbonate/ABS copolymer or blend, a polycarbonate-siloxane copolymer, isophthalate terephthalate resorcinol polycarbonate (ITR-PC), brominated polycarbonate, polyphenylene oxide/polystyrene blends, polypropylene, and combinations comprising at least one of the foregoing.

The acid source can generally be a dehydrating agent that can promote the formation of a carbonaceous char from the carbon source. The acid source can comprise a material such as acids (e.g., phosphoric acid), ammonium polyphosphate, ammonium phosphate, diammonium phosphate, organo-phosphorous acids (e.g., alkyl phosphate), and combinations comprising at least one of the foregoing. The expanding agent can comprise a material that releases nitrogen or can alternatively, comprise a halogen. Expanding agent generally refers to an intumescing agent that can expand the intumescent material upon heating. For example, the expanding agent can comprise a material such as urea, melamine (e.g., melamine phosphate and/or melamine polyphosphate), polyamides, chlorinated parrafins, metal hydrates (e.g., magnesium hydroxide, aluminum hydroxide, zinc borate, etc.), magnesium calcium carbonate (CaMg$_3$(CO$_3$)$_4$; e.g., Huntite, commercially available from MINELCO), and combinations comprising at least one of the foregoing. The charring agent can comprise a material such as silica materials (e.g., cyclic silicone), glass fibers, talc, metal oxides, magnesium carbonate, magnesium calcium carbonate (e.g., Huntite, commercially available from MINELCO), carbon (e.g., graphite), silicon carbide, bisphenol-A diphenyl phosphate (BPADP), and combinations comprising at least one of the foregoing. Not to be limited by theory, it is believed that the char produced from the intumescent material when exposed to heat and/or flames provides a physical barrier to heat and mass transfer, which therefore interferes with the combustion process.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 shows a multilayer sheet 10 comprising a core layer 12 and a first cap layer 14. The core layer 12 has a core layer first surface 16 and a core layer second surface 18 and the first cap layer 14 has a first cap layer first surface 20 and a first cap layer second surface 22. The core layer first surface 16 is located on the first cap layer 14 second surface. The first cap layer 14 and the core layer 12 can optionally be co-extruded with one another. As shown in FIG. 1, the first cap layer 14 can be disposed upon and in intimate contact with (e.g., physical contact) with the core layer 12. For example, the first cap layer second surface 22 can be in direct contact with the core layer first surface 16. Optionally a first coating layer can be present and disposed upon and in intimate contact (e.g., physical contact) with the first cap layer first surface 20 and a second coating layer can be disposed upon and in intimate contact with (e.g., physical contact) with the core layer second surface 18.

Figure 2:
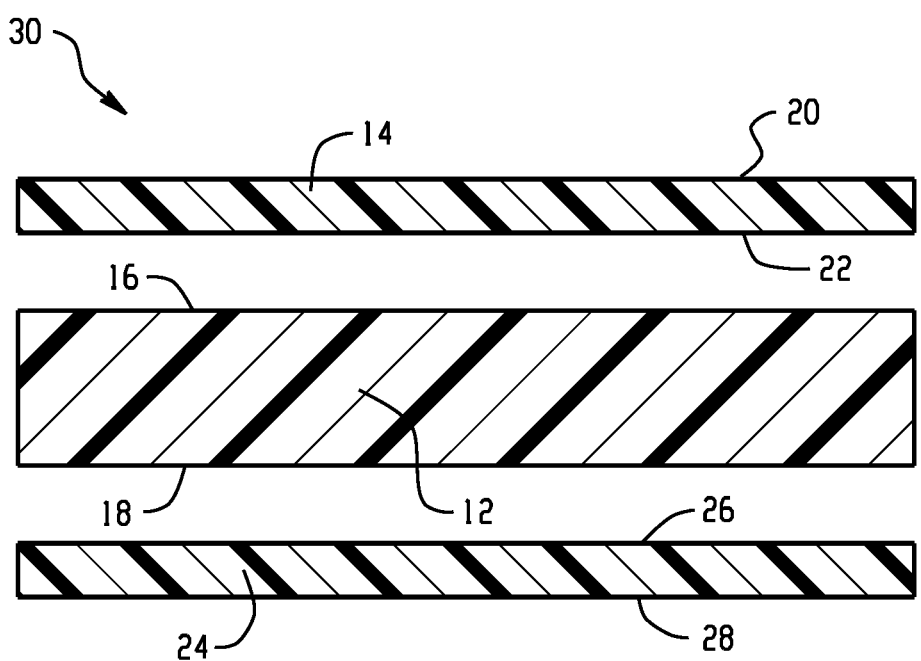
FIG. 2 is a depiction of a multilayer sheet comprising a core layer disposed between a first cap layer and a second cap layer.

FIG. 2 shows another multilayer sheet 30 wherein the multilayer sheet 30 comprises a core layer 12 located between a first cap layer 14 and a second cap layer 24 where the core layer 12 has a core layer first surface 16 and a core layer second surface 18 and the first cap layer 14 has a first cap layer first surface 20 and a first cap layer second surface 22. The second cap layer 24 has a second cap layer first surface 26 and a second cap layer second surface 28. As shown in FIG. 2, the first cap layer 14 can be disposed upon and in intimate contact (e.g., physical contact) with the core layer 12. For example, the first cap layer second surface 22 can be in direct contact with the core layer first surface 16. Optionally a first coating layer can be present and disposed upon and in intimate contact (e.g., physical contact) with the first cap layer first surface 20 and a second coating layer can be disposed upon and in intimate contact (e.g., physical contact) with the core layer second surface 18. The second cap layer 24 can be disposed upon and in intimate contact with (e.g., physical contact) the core layer 12. For example, the second cap layer first surface 26 can be disposed upon and in intimate contact with (e.g., physical contact) the core layer second surface 18. Stated another way the core layer 12 can be layer A and the first cap layer 14 and the second cap layer 24 can be layer B such that a B-A-B configuration of the layers can be achieved.

The following example are merely illustrative of the multilayer sheets disclosed herein and are not intended to limit the scope hereof.

EXAMPLES

In the following examples, multilayer sheets were constructed and tested for various physical and mechanical properties.

Thermal shrinkage of the multilayer sheets was measured according to ASTM D1204 with a thermal treatment of the sheet at 150° C. for 30 minutes. Water vapor barrier was characterized with water vapor transmission rate (WVTR). WVTR can be measured according to ASTM F1249. All WVTR reported in the examples was tested at conditions of 38° C. and 100% relative humidity. Tensile properties of the multilayer sheet were measured according to ASTM D882. Interlayer peeling strength was measured by the T-peel method according to ISO 11339. Xenon-arc weathering was also tested. For this test, a Xe-arc weather-o-meter was used for accelerated ultraviolet weathering tests. The lamp is constantly on and the irradiance level at the sample surface is 1.3 Watts per square meter per nanometer (W/m$^2$/nm) at 340 nm. The air of 40° C. and the black panel temperature of 80° C. were used in the dry segment (160 minutes in every 180 minute cycle) and 30° C. of both air and black panel temperatures were used in the wet segment with water spray (20 minutes in very 180 minute cycle). Color of the opaque films was measured using the reflection mode on an Xrite Color-Eye 7000A colorimeter. Light source of D65 and 10 degree observer angle were used.

Example 1

Two multilayer sheets, Sample 1 and Sample 2, were made by co-extruding a polyphenylene ether based composition and a polypropylene based composition where the core layer comprised the poly(phenylene ether) based composition (layer A) and the cap layer comprised the polypropylene based composition (layer B) in a B-A-B layer configuration. The details of the composition of each layer are provided in Tables 1 and 2. PP1 was a white based polypropylene composition, while PP2 was a black based polypropylene composition. The total thickness of the films was 300 micrometers with 75 micrometer thick cap layers on both sides of the 150 micrometer thick core layer.

TABLE 1

Core Layer Composition

| COMPONENT | PPE1 |
|---|---|
| 0.40IV, LOW LOW ODOR PPO | 67.90 |
| POLYSTYRENE | 0.00 |
| Kraton G1650 (SEBS IMPACT MODIFIER) | 20.00 |
| Polysalicylate Acetate (PSal-A), milled | 4.70 |
| POLYETHYLENE, GRANULAR, LLDPE | 0.60 |
| HINDERED PHENOL STABILIZER | 0.50 |
| ZINC SULFIDE | 0.20 |
| MAGNESIUM OXIDE | 0.20 |
| PHOSPHITE STABILIZER | 0.30 |
| Irganox MD1024 | 0.10 |
| Carbon black, beaded, low color | 0.50 |

TABLE 2

Cap Layer Compositions

| COMPONENT | PP1 (white) | PP2 (black) |
|---|---|---|
| SABIC ® 71EK71PS polypropylene block copolymer | 51.45 | 62.95 |
| TINUVIN 770 | 0.2 | 0.2 |
| CHIMASSORB 81 | 0.2 | 0.2 |
| IRGASTAB FS 301 FF | 0.3 | 0.3 |
| Uvinul 5050 | 0.8 | 0.8 |
| Hycite 713 | 0.05 | 0.05 |
| TiO2 (Kronos 2233) | 12 | 0 |
| Carbon Black PP-Concentrate (50 wt %) | 0 | 0.5 |
| Magnesium hydroxide | 30 | 30 |
| DOW CORNING 4-7081 resin modifier | 5 | 5 |

The co-extruded films in these Samples showed a strong interlayer bonding without delamination issues even after a pressure cooker treatment at 121° C., 18 pounds per square inch (psi) (124 kiloPascals) moisture pressure for 72 hours. The multilayer sheet thermal dimensional stability (i.e., shrinkage), partial discharge voltage, WVTR, and hydrothermal resistance performance of the multilayer sheets were tested, and the results are summarized in Table 3.

TABLE 3

Test Results of Co-Extruded PPE Sheets

| Items | Description (unit) | Sample 1 | Sample 2 |
|---|---|---|---|
| Resin composition | Core layer (A) | PPE1 | PPE1 |
|  | Caplayer (B) | PP1 (black) | PP2 (white) |
| Film thickness | Total thickness (μm) | 300 | 300 |
|  | B-A-B layer thickness (μm) | 75-150-75 | 75-150-75 |
| Film thermal shrinkage at 150° C. and 30 minute | MD/TD (%) | 0.6%/0.3% | 0.6%/0.3% |
| Partial discharge voltage (PDV) | volt | 923 | 968 |
| WVTR | g/(m$^2$ * 24 h) | N/A | 3.6 |
| Tensile properties retention after pressure cooker treatment | Retention of ten. strength at break (%) | 88% | 90% |
|  | Retention of ten. elongation at break (%) | 68% | 97% |
| Initial tensile properties | Strength @ break (MPa) | 44 | 38 |
|  | Strain @ break (%) | 70 | 69 |

The interlayer bonding strength between the core layer and the cap layer can be measured using a T-peel method.

First, single layer films were individually made of various polyphenylene ether compositions and polypropylene compositions. Then, a hot press was used to press a polyphenylene ether based layer and two polypropylene based layers into a B-A-B sandwich configuration at the temperature close to the extrusion temperature which is 205° C. The interlayer bonding strength between the core layer (polyphenylene based layer) and the cap layers (polypropylene based layers) was measured using the T-peel method on a tensile machine. The results of the interlayer bonding strength as a variation of polyphenylene ether composition are shown in Table 4. It is noted that the values for Samples 3 to 7 in Table 4, were based on a hot press laminate, which differs from co-extruded Samples 1 and 2.

TABLE 4

Compositions of PPE Layers and Various Mechanical Properties

| Components | | Sample 3 | Sample 4 | Sample 5 | Sample 6 | Sample 7 |
|---|---|---|---|---|---|---|
| 0.40IV PPO | | | 84.2 | 77.4 | 72.6 | 67.9 |
| 0.46IV PPO | | 84.5 | | | | |
| POLYSTYRENE | | | | | | |
| High Mw SEBS IMPACT MODIFIER (Kraton G1651H) | | 5.6 | 5.6 | | | |
| Low/Medium Mw SEBS IMPACT MODIFIER (Kraton G1650) | | 0.0 | 0.0 | 10.0 | 15.0 | 20.0 |
| Polysalicylate Acetate (PSal-A), milled | | | | 5.2 | 5.0 | 4.7 |
| Bisphenol-A bis (Diphenyl Phosphate) | | | | 5.0 | 5.0 | 5.0 |
| Resorcinol bis(Diphenyl phosphate) | | 7.9 | 7.9 | | | |
| POLYETHYLENE, GRANULAR, LLDPE | | 0.6 | 0.9 | 0.6 | 0.6 | 0.6 |
| HINDERED PHENOL STABILIZER | | | | 0.5 | 0.5 | 0.5 |
| SEENOX 412S Pentaerythritol tetrakis (beta-lauryl Crompton thiopropionate) | | 1.1 | 1.1 | | | |
| ZINC SULFIDE | | 0.1 | 0.1 | 0.2 | 0.2 | 0.2 |
| MAGNESIUM OXIDE | | 0.3 | 0.3 | 0.2 | 0.2 | 0.2 |
| PHOSPHITE STABILIZER | | | | 0.3 | 0.3 | 0.3 |
| Irganox MD1024 | | | | 0.1 | 0.1 | 0.1 |
| Carbon black | | | | 0.5 | 0.5 | 0.5 |
| Sum | | 100.0 | 100.0 | 100.0 | 100.0 | 100.0 |
| Testing item | | | | | | |
| PPE layer thickness (mm) | mm | 0.25 | 0.25 | 0.25 | 0.25 | 0.25 |
| Thermal shrinkage at 150° C./ | MD | 0.3% | 0.3% | 0.4% | 0.1% | 0.6% |
| 30 min (%) | TD | 0.3% | 0.3% | 0.2% | 0.1% | 0.1% |
| UL94-result | | V0 | VTM0 | HB | HB | HB |
| Interlayer bonding force to a PP layer (laminated @ 205° C.) (N/mm) | | <0.1 | <0.1 | 0.2 | 0.4 | 0.9 |

The multilayer sheets disclosed herein include(s) at least the following aspects:

Aspect 1: A multilayer sheet, comprising: a core layer comprising a composition comprising about 60 to about 90 weight percent of polyphenylene, about 0 to about 20 weight percent of polystyrene, about 10 to about 20 weight percent of a hydrogenated block copolymer of an alkenyl aromatic compound and a conjugated diene, and optionally, a flame retardant additive; and a first cap layer disposed on a surface of the core layer, wherein the first cap layer comprises polypropylene.

Aspect 2: The multilayer sheet of Aspect 1, wherein the polyphenylene comprises poly(phenylene ether).

Aspect 3: The multilayer sheet of Aspect 1 or Aspect 2, wherein the polyphenylene has an intrinsic viscosity of 0.25 to 0.50.

Aspect 4: The multilayer sheet of any of the preceding aspects, wherein the hydrogenated block copolymer has a weight average molecular weight of 100,000 to 150,000.

Aspect 5: The multilayer sheet of any of the preceding aspects, wherein the flame retardant additive is present in an amount of about 5 to about 30 weight percent.

Aspect 6: The multilayer sheet of any of the preceding aspects, wherein the flame retardant additive comprises a halogen containing flame retardant additive, a non-halogen containing flame retardant additive, or a combination comprising at least one of the foregoing, preferably wherein the halogen containing flame retardant additive comprises a phosphorous containing flame retardant additive.

Aspect 7: The multilayer sheet of any of the preceding aspects, wherein the polypropylene comprises a polypropylene homopolymer or a polypropylene copolymer.

Aspect 8: The multilayer sheet of any of the preceding aspects, wherein the first cap layer further comprises an ultraviolet light stabilizer, an ultraviolet light absorber, a flame retardant additive, or a combination comprising at least one of the foregoing.

Aspect 9: The multilayer sheet of Aspect 8, wherein the flame retardant additive comprises a non-halogenated flame retardant additive, preferably wherein the flame retardant additive comprises an intumescent flame retardant additive.

Aspect 10: The method of any of the preceding aspects, wherein the hydrogenated block copolymer of an alkenyl aromatic compound and a conjugated diene comprises a hydrogenated diblock or triblock copolymers of polystyrene and polyethylene-butylene, or a combination comprising at least one of the foregoing, preferably wherein the hydrogenated diblock or triblock copolymers comprise styrene ethylene butene, styrene ethylene butene styrene, or a combination comprising at least one of the foregoing.

Aspect 11: The multilayer sheet of any of the preceding aspects, further comprising a second cap layer disposed on another surface of the core layer, wherein the second cap layer comprises polypropylene.

Aspect 12: The multilayer sheet of any of the preceding aspects, wherein the interlayer bonding strength between the first layer and the second layer as measured according to ISO 11339 is greater than or equal to 0.1 Newtons per millimeter.

Aspect 13: The multilayer sheet of any of the preceding aspects, wherein a thickness of the multilayer sheet is 200 micrometers to 1000 micrometers, preferably wherein the thickness is 250 micrometers to 500 micrometers, preferably, wherein the thickness is 300 micrometers.

Aspect 14: The multilayer sheet of any of the preceding aspects, wherein thermal shrinkage of the multilayer sheet at 150° C. for 30 minutes is less than or equal to 0.5% in the machine direction and less than or equal to 0.4% in the transverse direction.

Aspect 15: An article comprising the multilayer sheet of any of the preceding aspects, wherein the article is selected from a photovoltaic module, a solar hot water system, lithium-ion battery insulation, heat shielding, printed circuit board insulation, aircraft interior applications, railcar interior applications, business equipment insulation, computer rack partitions, monitor insulation.

Aspect 16: A method of making a multilayer sheet, comprising: co-extruding a core layer and a first cap layer, wherein the core layer comprises about 60 to about 90 weight percent of polyphenylene, about 0 to about 20 weight percent of polystyrene, about 10 to about 20 weight percent of a hydrogenated block copolymer of an alkenyl aromatic compound and a conjugated diene, and optionally, a flame retardant additive; and wherein the first cap layer comprises polypropylene.

Aspect 17: The method of Aspect 16, further comprising co-extruding a second cap layer with the core layer and the first cap layer, wherein the core layer is disposed between the first cap layer and the second cap layer.

Aspect 18: The method of Aspect 17, wherein the second cap layer comprises polypropylene.

Aspect 19: A multilayer sheet, comprising: a core layer disposed between a first cap layer and a second cap layer; wherein the core layer comprises 60 to 85 weight percent of polyphenylene ether, 10 to 20 weight percent of polystyrene, 10 to 20 weight percent of a hydrogenated block copolymer of an alkenyl aromatic compound and a conjugated diene, and a flame retardant additive; and wherein the first cap layer and/or the second cap layer comprises polypropylene.

Aspect 20: The multilayer sheet of Aspect 19, wherein the first cap layer and/or the second cap layer comprise a flame retardant additive, preferably wherein the flame retardant additive is an intumescent flame retardant additive and wherein the first cap layer and/or the second cap layer comprises an ultraviolet light stabilizer.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl)a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —CH$_2$CH$_2$CN is a $C_2$ alkyl group substituted with a nitrile.

Unless substituents are otherwise specifically indicated, each of the foregoing groups can be unsubstituted or substituted, provided that the substitution does not significantly adversely affect synthesis, stability, or use of the compound. "Substituted" means that the compound, group, or atom is substituted with at least one (e.g., 1, 2, 3, or 4) substituents instead of hydrogen, where each substituent is independently nitro (—NO$_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g., benzyl), $C_{7-12}$ alkylarylene (e.g., toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl (CH$_3$C$_6$H$_4$SO$_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the compound or group, including those of any substituents.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The modifier "about" used in connection with a quantity is inclusive of the stated value and has the meaning dictated by the context (e.g., includes the degree of error associated with measurement of the particular quantity). The notation "±10%" means that the indicated measurement can be from an amount that is minus 10% to an amount that is plus 10% of the stated value. The terms "front", "back", "bottom", and/or "top" are used herein, unless otherwise noted, merely for convenience of description, and are not limited to any one position or spatial orientation. "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

Unless otherwise specified herein, any reference to standards, regulations, testing methods and the like, such as ASTM D1003, ASTM D4935, ASTM 1746, FCC part 18, CISPR11, and CISPR 19 refer to the standard, regulation, guidance or method that is in force at the time of filing of the present application.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxys; $C_{6-10}$ aryloxy such as phenoxy; $C_{1-6}$ alkylthio; $C_{1-6}$ or $C_{1-3}$ alkylsulfinyl; C1-6 or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ arylalkyl having 1 to 3 separate or fused rings and from 6 to 18 ring carbon atoms; or arylalkoxy having 1 to 3 separate or fused rings and from 6 to 18 ring carbon atoms, with benzyloxy being an exemplary arylalkoxy.

All cited patents, patent applications, and other references are incorporated herein by reference in their entirety. However, if a term in the present application contradicts or conflicts with a term in the incorporated reference, the term from the present application takes precedence over the conflicting term from the incorporated reference. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A multilayer sheet, comprising:
   a core layer comprising a composition comprising about 60 to about 90 weight percent of polyphenylene, about 0 to about 20 weight percent of polystyrene, about 10 to about 20 weight percent of a hydrogenated block copolymer of an alkenyl aromatic compound and a conjugated diene, and optionally, a flame retardant additive;
   a first cap layer disposed on a surface of the core layer, wherein the first cap layer comprises polypropylene; a second cap layer disposed on another surface of the core layer, wherein the second cap layer comprises polypropylene wherein the hydrogenated block copolymer has a weight average molecular weight of 100,000 to 150,000; and wherein the hydrogenated block copolymer of an alkenyl aromatic compound and a conjugated diene comprises a polystyrene-poly(ethylene-butylene) diblock copolymer, a polystyrene-poly(ethylene-butylene)-polystyrene triblock copolymer, a polystyrene-poly(ethylene-butylene-styrene)-polystyrene tapered block copolymer, or a combination comprising at least one of the foregoing; and wherein thermal shrinkage of the multilayer sheet at 150° C. for 30 minutes is less than or equal to 0.5% in the machine direction and less than or equal to 0.4% in the transverse direction.

2. The multilayer sheet of claim 1, wherein the hydrogenated block copolymer comprises the hydrogenated polystyrene-poly(ethylene-butylene)-polystyrene triblock copolymer which comprises 25 to 40 weight percent polystyrene based on the weight of the block copolymer; and
wherein the polyphenylene comprises poly(phenylene ether) having an intrinsic viscosity of 0.25 to 0.50.

3. A multilayer sheet, comprising:
a core layer comprising a composition comprising about 60 to less than 68 weight percent of polyphenylene, about 0 to about 20 weight percent of polystyrene, about 10 to about 20 weight percent of a hydrogenated block copolymer of an alkenyl aromatic compound and a conjugated diene, and optionally, a flame retardant additive;
a first cap layer disposed on a surface of the core layer, wherein the first cap layer comprises polypropylene;
a second cap layer disposed on another surface of the core layer, wherein the second cap layer comprises polypropylene; and wherein thermal shrinkage of the multilayer sheet at 150° C. for 30 minutes is less than or equal to 0.5% in the machine direction and less than or equal to 0.4% in the transverse direction.

4. The multilayer sheet of claim 3, wherein the polyphenylene is poly(phenylene ether).

5. The multilayer sheet of claim 3, wherein the polyphenylene has an intrinsic viscosity of 0.25 to 0.50.

6. The multilayer sheet of claim 3, wherein the flame retardant additive is present in the core in an amount of 0 to less than 10 weight percent.

7. The multilayer sheet of claim 3, wherein the flame retardant additive comprises a halogen containing flame retardant additive, a non-halogen containing flame retardant additive, or a combination comprising at least one of the foregoing.

8. The multilayer sheet of claim 3, wherein the polypropylene of the first cap layer comprises a polypropylene homopolymer or a polypropylene copolymer.

9. The multilayer sheet of claim 3, wherein the first cap layer further comprises an ultraviolet light stabilizer, an ultraviolet light absorber, a flame retardant additive, or a combination comprising at least one of the foregoing.

10. The multilayer sheet of claim 9, wherein the flame retardant additive comprises a non-halogenated flame retardant additive.

11. The multilayer sheet of claim 3, wherein the hydrogenated block copolymer comprises a hydrogenated polystyrene-poly(ethylene-butylene)-polystyrene triblock copolymer which comprises 25 to 40 weight percent polystyrene based on the weight of the block copolymer.

12. The multilayer sheet of claim 3, wherein a thickness of the core layer is less than or equal to 300 micrometers and a thickness of the multilayer sheet is 200 micrometers to 1000 micrometers.

13. An article comprising the multilayer sheet of claim 3, wherein the article is selected from a photovoltaic module, a solar hot water system, lithium-ion battery insulation, heat shielding, printed circuit board insulation, an aircraft interior application, a railcar interior application, business equipment insulation, a computer rack partition, or monitor insulation.

14. A multilayer sheet, comprising:
a core layer comprising a composition comprising about 60 to less than 68 weight percent of polyphenylene, greater than 0 to about 20 weight percent of polystyrene, about 10 to about 20 weight percent of a hydrogenated block copolymer of an alkenyl aromatic compound and a conjugated diene, and 0 to less than 10 weight percent of a flame retardant additive; wherein the hydrogenated block copolymer of an alkenyl aromatic compound and a conjugated diene comprises a hydrogenated diblock or triblock copolymers of polystyrene and polyethylene-butylene, or a combination comprising at least one of the foregoing;
a first cap layer disposed on a surface of the core layer, wherein the first cap layer comprises polypropylene;
a second cap layer disposed on another surface of the core layer, wherein the second cap layer comprises polypropylene;
wherein the interlayer bonding strength between the first cap layer and the core layer as measured according to ISO 11339 is greater than or equal to 0.1 Newtons per millimeter; and wherein thermal shrinkage of the multilayer sheet at 150° C. for 30 minutes is less than or equal to 0.5% in the machine direction and less than or equal to 0.4% in the transverse direction.

\* \* \* \* \*